United States Patent

Winter

Patent Number: 5,219,062
Date of Patent: Jun. 15, 1993

[54] CONVEYOR ARRANGEMENT FOR LOOSE MATERIAL, ESPECIALLY BLASTING MATERIALS FOR SAND-BLASTING INSTALLATIONS

[75] Inventor: Alfred Winter, Wolfpassing, Austria

[73] Assignee: Hans Oetiker AG Maschinen- und Apparatefabrik, Horgen, Switzerland

[21] Appl. No.: 786,592

[22] Filed: Nov. 1, 1991

[30] Foreign Application Priority Data

Mar. 2, 1990 [AT] Austria .............................. A 504/90

[51] Int. Cl.$^5$ ............................................. B65G 25/00
[52] U.S. Cl. ................................... 198/601; 198/741; 198/743
[58] Field of Search ............... 198/601, 614, 741, 743, 198/739

[56] References Cited

U.S. PATENT DOCUMENTS

| | | | |
|---|---|---|---|
| 2,790,537 | 4/1957 | Howe et al. | 198/601 |
| 3,128,875 | 4/1964 | Kay et al. | 198/743 |
| 3,310,150 | 3/1967 | Southard | 198/743 X |
| 3,581,712 | 6/1971 | Ferris | 198/743 |
| 3,790,007 | 2/1974 | Sprague | 198/743 X |
| 4,018,329 | 4/1977 | Jarvis | 198/743 |
| 5,040,665 | 8/1991 | Suzuki | 198/743 |

Primary Examiner—Joseph E. Valenza
Assistant Examiner—Tuan N. Nguyen
Attorney, Agent, or Firm—Paul M. Craig, Jr.

[57] ABSTRACT

A conveyor installation for loose material, especially blasting materials for sand-blasting installations, includes on the hall floor, respectively, blast chamber floor at least one longitudinal conveyor (1, 2, 3, 4) and at right angle thereto at its conveyor end in the same plane a cross-conveyor (5). These conveyors (1, 2, 3, 4, 5) operate by the use of conveyor members (27, 28) which are suspended in a pneumatically driven reciprocating frame (19, 24, 33). The frames (19, 24, 33) include lateral girders (20, 21; 31, 32) which are connected by webs (22). The frames run on rollers (11 to 18, 34, 36) which project from boundary profiles (6, 7, 8, 9, 10). The latter delimit laterally the longitudinal conveyors (1, 2, 3, 4). The cross-conveyor (5) includes a boundary profile (35) with rollers (34) only at the side opposite the longitudinal conveyors whereas on the side facing the longitudinal conveyors the rollers (36) are provided at the end faces of the boundary profiles (7, 8, 9) of the longitudinal conveyors. For creating a free passage from the longitudinal conveyors to the cross conveyor, the frame girder (31) thereof which faces the longitudinal conveyors, is constructed with a short vertical leg.

15 Claims, 1 Drawing Sheet

CONVEYOR ARRANGEMENT FOR LOOSE MATERIAL, ESPECIALLY BLASTING MATERIALS FOR SAND-BLASTING INSTALLATIONS

FIELD OF INVENTION

The invention relates to a conveyor arrangement for loose material, especially blasting materials for sand-blasting installations with at least one longitudinal conveyor which terminates in a cross conveyor, whereby the conveyors include a large number of conveyor members moving to and fro in the conveying direction and adapted to fold over toward a side.

BACKGROUND OF INVENTION

In the known sand-blasting installations, a grate is disposed above the hall floor, below which several longitudinal conveyors push the sand dropping-down during sand-blasting in one direction by means of conveyor members, where they drop into a recess in the hall floor, in which a cross conveyor takes over the further transporting of the blasting sand. The cross conveyor pushes the blasting sand which has been pushed toward the same by the longitudinal conveyors, into a pit, from which a bucket-type mechanism conveys the sand upwardly and feeds the same to a preparation installation. Sand-blasting installations which are equipped with such a conveyor arrangement are able to operate continuously. The drives of the individual longitudinal conveyors and of the cross-conveyor operate individually by means of crank drives which impart to the foldable conveyor members a to-and-fro movement. The conveyor action results from the fact that the conveyor members, whose distance is smaller or equal to the stroke of the drive, assume a vertical position in the conveying direction and thus push the sand in front of them whereas during the return movement, they fold over and slide over the sand to be conveyed into the starting position. In a known construction, the conveyor members are formed by vertically arranged rigid rakes at which rubber flaps abut unilaterally. In the pushing direction corresponding to the conveying direction, the rubber flaps are pressed against the rakes. During the opposite movement (coasting movement), the rubber flaps give way and pass over the surface of the sand without taking the same along. The efficiency of this system is impaired by the rigid, non-retracting prongs of the rake. This conveyor installation requires structural change measures of the hall owing to the required level jumps. Furthermore, the rubber members are subjected to a very strong wear and have to be exchanged frequently, whereby a disassembly of screwed-together clamping members is required.

SUMMARY OF INVENTION

The invention aims at improving a conveyor installation of the aforementioned type regards conveying capacity and maintenance and to so construct the same that structural change work in a hall can be dispensed with. This is achieved in that longitudinal conveyor and the cross conveyor are arranged in one and the same plane and the longitudinal conveyor or conveyors include stationary lateral boundary profiles disposed parallel to one another, for example, I-profiles, with rollers projecting toward one another, on which at least one frame constructed as carriage, in which the conveyor members are suspended, is supported preferably pneumatically longitudinally displaceable and in that the analogously constructed cross-conveyor is laterally open within the area of termination, respectively, terminations of the longitudinal conveyor or conveyors and a frame of the cross conveyor carrying the conveyor members is supported on rollers which are arranged on the end faces of the boundary profiles of the longitudinal conveyor or conveyors at the termination side, whereas the rollers are supported outside of the termination area on their own boundary profiles. As a result thereof, the longitudinal conveyors push the sand laterally into the cross conveyor without requiring that the latter be arranged at a lower level. It is appropriate if the frames of the longitudinal and of the cross conveyor include at their lateral girders or sheet metal members mutually oppositely disposed, approximately vertically arranged retaining projections, for example, sheet metal nose members, in which are suspended the conveyor members that are constructed as V-shaped angularly bent sheet metal members having along and a short leg in cross section. These conveyor members fold back in their entirety during the idling stroke so that the efficiency is improved. The exchange can take place by simple lifting of the conveyor members. Furthermore, it is advantageous if the girders have a T-shaped profile whose one horizontal profile web extends over the conveyor members along the edge side. The lifting of the conveyor members is prevented thereby.

DESCRIPTION OF THE DRAWING

One embodiment of the invention subject matter is illustrated in the drawings.

DETAILED DESCRIPTION OF INVENTION

Figure 1:
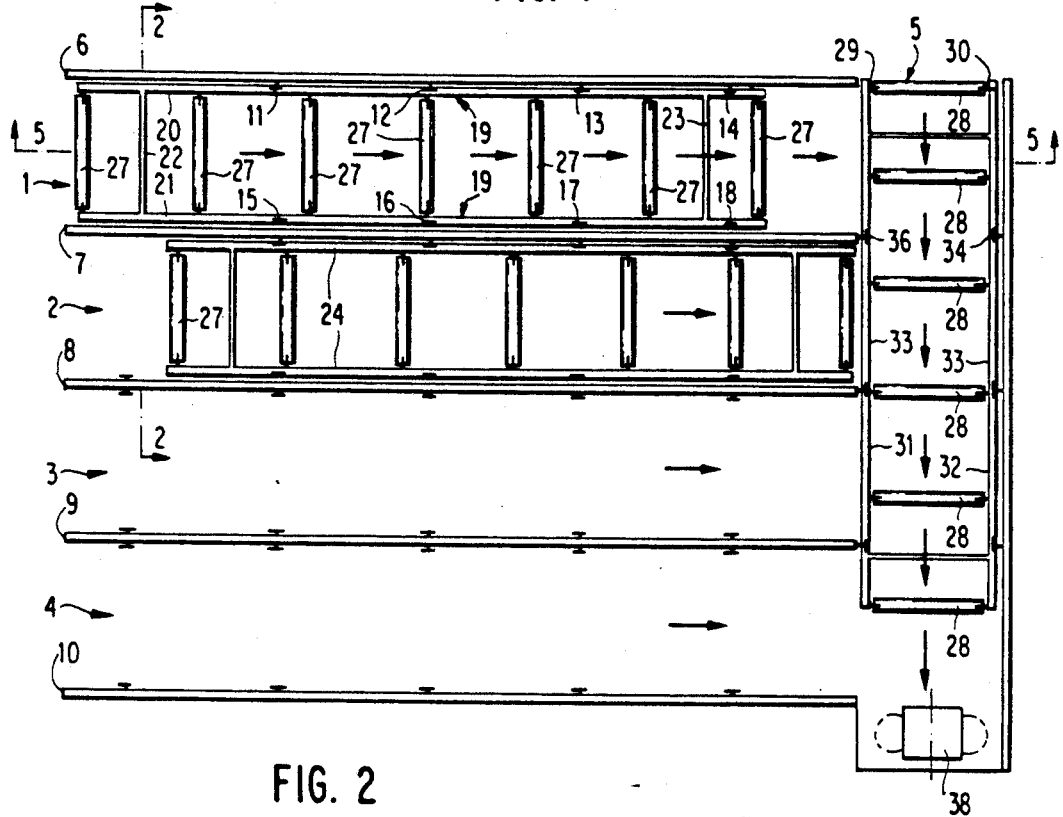
FIG. 1 shows a plan view on the floor of a blasting chamber in a hall with removed grate, FIG. 2 a cross section according to the line II—II in FIG. 1, FIG. 3 a partial side elevation of FIG. 1 on an enlarged scale during the working stroke, FIG. 4 an illustration according to FIG. 3, however during the idling stroke, and FIG. 5 a partial cross section according to the line V—V of FIG. 1.
Figure 2:
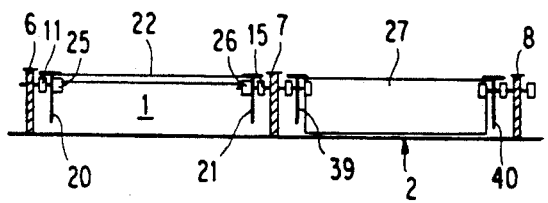
Figure 3:
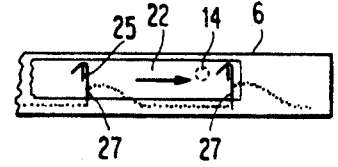

According to FIG. 1, several (in the embodiment four) longitudinal conveyors 1, 2, 3, 4 operating in the arrow direction are arranged parallel to one another on a hall floor, respectively, the floor of a blast chamber, which cooperate with a cross conveyor 5. Each longitudinal conveyor 1 to 4 includes lateral boundary profiles 6, 7, respectively, 7, 8, respectively, 8, 9 and 9, 10 which carry on their plane surfaces rollers 11, 12; 13, 14; 15, 16 and 17, 18 facing one another and disposed pairwise mutually opposite one another. In the same manner, rollers are also provided at the longitudinal conveyors 2, 3 and 4. A frame 19 constructed as carriage rests in each case on the rollers which consists of lateral girders 20, 21 that are rigidly connected with each other by spacer webs 22, 23. The girders 20, 21 are angularly bent L-shaped in cross section (FIG. 2) and rest with the one leg of the profile on the rollers 11 to 18. The frame 19 is thus reciprocable on the rollers. The same is true in a similar manner for the frame 24 of the longitudinal conveyor 2. With the longitudinal conveyors 3 and 4, the frame are not shown for reasons of better visibility. The girders 20, 21 carry retaining projections 25, 26 on which conveyor members 27 are suspended. In FIG. 2, the conveyor members are suspended only at the longitudinal conveyor 2. As shown in FIG. 3, the conveyor members 27 are formed by sheet metal members which are angularly bent in cross section and correspond approximately to the number "1." The conveyor members 27 are suspended on the retaining projections 25, 26 by means of their V-shaped angular part.

Figure 4:
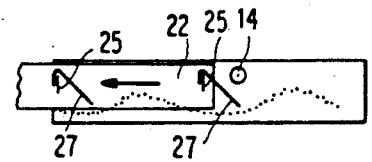

It can be seen from FIGS. 3 and 4 that the conveyor members 27 convey the sand indicated in dash lines toward the right during a stroke in the arrow direction (working stroke) according to FIG. 3, whereas during the return movement of the frame 19, respectively 24, the conveyor members 27 fold away in the arrow direction according to FIG. 4 and slide over the sand.

The drive of the frames 19, respectively, 24 takes place in a concrete embodiment hydraulically by a reversingly controlled pressure cylinder with a piston actuated on both sides whose piston rod engages directly at the frames. One drive of its own is provided for each longitudinal conveyor. The drives are not shown in the drawing.

Figure 5:
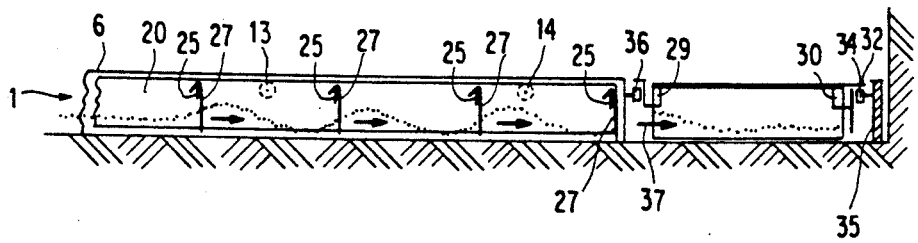

The cross-conveyor 5 is constructed similar to the longitudinal conveyors 1, 2, 3 and 4. Conveyor members 28 are again provided which are suspended on retaining projections 29, 30 that project from girders 31, 32 of a frame 33. The pneumatic double-acting cylinders (not illustrated) transmit a to-and-fro movement onto the frame 33 which, together with the conveyor members 28, transports the sand pushed laterally into the cross conveyor 5 in the direction of the arrow. Whereas the girder 32 is supported on rollers 34 which project from a boundary profile 35, the girder 31 rests on rollers 36 which are provided end-face at the boundary profiles 7, 8 and 9. The girder 31 of the frame 33 includes a shortened vertical leg so that a free passage, respectively, transition between the longitudinal conveyors 1, 2; 3 and 4 and the cross-conveyor 5 results (arrow 37 in FIG. 5). FIG. 5 further illustrates that the entire conveyor installation is provided in a single plane, namely, the floor plane of the hall or of the sand-blasting chamber.

A cup-type mechanism 38 (FIG. 1) is arranged at the end of the conveyor path of the cross-conveyor 5 which picks up the conveyed sand, transports the same upwardly and feeds the same to a preparation installation. Thereafter the sand reaches again the high pressure blasting installation.

FIG. 2 further illustrates in connection with the example of the longitudinal conveyor 2 that the lateral girders 39, 40 can also be constructed as T-shaped profiles. The one horizontal profile web of the T-profile runs on the rollers whereas the other symmetrical one overlaps the conveyor members 27 at their upper ends and thus precludes a lifting off of the same. This girder construction can be used in connection with the frames of the longitudinal conveyors (1, 2, 3, 4) as also of the cross conveyor (5).

Both longitudinal conveyors 1, 2, 3 and 4 as also cross conveyor 5 may each include on the roller tracks each in lieu of a single long frame 19, 24, 33 several short frames disposed one behind the other and coupled with one another. These short frames are not only more simple in manufacture than those frames which extend approximately over the entire length of the conveyor, but they may also be installed more easily and serviced more simply. The cup-type mechanism 38 is arranged in one and the same plane as the longitudinal conveyors 1, 2, 3 and 4 and the cross conveyor 5. It is not absolutely necessary to place the cup-type mechanism 38 at the end of the cross-conveyor 5 in a pit. All structural measures in a hall floor are therewith dispensed with. The entire installation can be assembled immediately in any place and put into operation. If a location change of the sand-blasting installation is required within the same enterprise, the displacement can be carried out in a short period of time and rapidly without interaction in the constructional substance.

While I have shown and described only one embodiment in accordance with the present invention, it is understood that the same is not limited thereto but is susceptible of numerous changes and modifications as known to those skilled in the art, and I therefore do no wish to be limited to the details shown and described herein but intend to cover all such changes and modifications as are encompassed by the scope of the appended claims.

I claim:

1. A conveyor installation for loose material, especially blasting materials for sand-blasting installations with at least one longitudinal conveyor means having a large number of conveyor members reciprocable in the conveying direction and operable to fold over, the longitudinal conveyor means including stationary lateral boundary profile means disposed substantially parallel to one another and provided with roller means, frame means supported on said roller means, the conveyor means being supported on said frame means, characterized int hat the longitudinal conveyor means terminates in a separate cross-conveyor means, said conveyor means having floor, all of the floors of the longitudinal conveyor means and of the cross-conveyor means being arranged in one and the same plane and the cross conveyor means being laterally open within the area of termination of respective longitudinal conveyor means, and in that further frame means are provided for carrying the conveyor members of the cross-conveyor means.

2. A conveyor installation according to claim 1, comprising additional roller means supporting said further frame means, some of said additional roller means being arranged on end faces of said profile means on the side thereof facing the cross conveyor means.

3. A conveyor installation according to claim 2, wherein others of said additional roller means are supported on further boundary profile means outside the termination area of said first conveyor means.

4. A conveyor installation according to claim 3, wherein the frame means and further frame means of the longitudinal conveyor means and of the cross-conveyor means include lateral girder-like members having mutually oppositely disposed, approximately vertically directed retaining projections.

5. A conveyor installation according to claim 4, wherein the conveyor members are suspended in said retaining projections.

6. A conveyor installation according to claim 5, wherein said projections are constructed as nose-like sheet metal members and the conveyor members are constructed as V-shaped angularly bent sheet metal members with a long and a short leg in cross section.

7. A conveyor installation according to claim 6, characterized in that the girder-like members have a T-profile whose one horizontal profile web rests on the roller means, whereas the other horizontal profile web overlaps the conveyor members along the edge.

8. A conveyor installation according to claim 7, further comprising a cup-type conveying device for conveying the loose material in the upward direction, said conveying device being located in the conveying plane of the longitudinal conveyor means and of the cross conveyor means adjoining the conveyor end of the latter.

9. A conveyor installation according to claim 1, wherein the frame means and further frame means of the longitudinal conveyor means and of the cross-conveyor means include lateral girder-like members having mutually oppositely disposed, approximately vertically directed retaining projections.

10. A conveyor installation according to claim 9, wherein the conveyor members are suspended in said retaining projections.

11. A conveyor installation according to claim 10, wherein said projections are constructed as nose-like sheet metal members and the conveyor members are constructed as V-shaped angularly bent sheet metal members with a long and a short leg in cross section.

12. A conveyor installation according to claim 9, characterized int hat the girder-like members have a T-profile whose one horizontal profile web rests on the roller means, whereas the other horizontal profile web overlaps the conveyor members along the edge.

13. A conveyor installation according to claim 1, further comprising a cup-type conveying device for conveying the loose material in the upward direction, said conveying device being located in the conveying plane of the longitudinal conveyor means and of the cross conveyor means adjoining the conveyor end of the latter.

14. A conveyor installation for loose material, especially blasting materials for sand-blasting installations with at least one longitudinal conveyor means which terminates in a separate cross-conveyor means, the conveyor means having a large number of conveyor members reciprocable in the conveying direction and operable to fold over, the longitudinal conveyor means and the cross-conveyor means being arranged in one and the same plane, the longitudinal conveyor means including stationary lateral boundary profile means disposed substantially parallel to one another and provided with roller means projecting toward one another, frame means constructed as carriage and supported on said roller means, the conveyor members being suspended on said frame means, the analogously constructed cross conveyor means being laterally open within the area of termination of respective longitudinal conveyor mean, and further frame means for carrying the conveyor members of the cross conveyor means, said further frame means being also supported on further roller means.

15. A conveyor installation for loose material, especially blasting materials for sand-blasting installations with at least one longitudinal conveyor means, the longitudinal conveyor means having a large number of conveyor members reciprocable in the conveying direction and operable to fold over, the longitudinal conveyor means including stationary lateral boundary profile means disposed substantially parallel to one another and provided with roller means, frame means supported on said roller means, the conveyor members being supported on said frame means, characterized in that the longitudinal conveyor means terminates in a separate cross-conveyor means, both said longitudinal and cross-conveyor means being arranged in one and the same plane and the cross conveyor means being laterally open within the area of termination of respective longitudinal conveyor means, in that the cross-conveyor means is provided with additional roller means, at least some of said additional roller means being arranged on end faces of said profile means on the side thereof facing the cross-conveyor means, and in that further frame means are supported on said additional roller means and carry conveyor members of the cross-conveyor means.

* * * * *